C. STIRN.
TEA STRAINER.
APPLICATION FILED JULY 26, 1915.
1,177,150.
Patented Mar. 28, 1916.
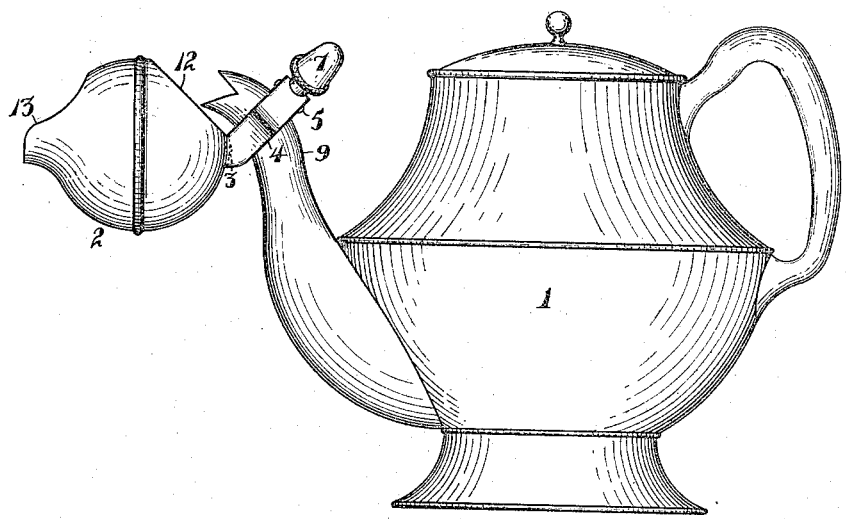
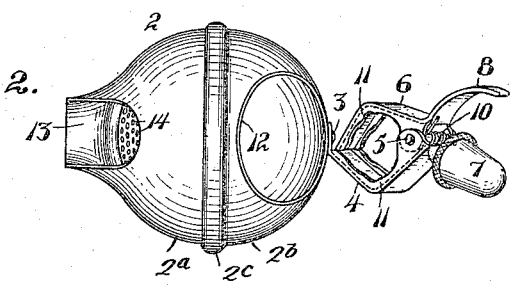
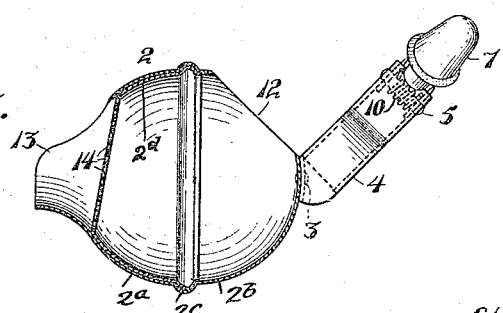
Inventor,
Charles Stirn,
By F. M. Wright
Attorney

UNITED STATES PATENT OFFICE.

CHARLES STIRN, OF SAN FRANCISCO, CALIFORNIA.

TEA-STRAINER.

1,177,150.  Specification of Letters Patent.  Patented Mar. 28, 1916.

Application filed July 26, 1915. Serial No. 41,911.

*To all whom it may concern:*

Be it known that I, CHARLES STIRN, a subject of the Grand Duchess of Luxemburg, residing at San Francisco, in the county of San Francisco and State of California, have invented new and useful Improvements in Tea-Strainers, of which the following is a specification.

This invention relates to a strainer for tea and coffee pots, the object of the invention being to provide a strainer of this character which will effectually strain the tea or coffee; which, after use, will stand in such a position that the liquid therein can not drip therefrom and that grounds of the tea or coffee will drop into a position in which they will not obstruct the flow of the liquid therethrough; and which can fit a spout of almost any shape or size.

In the accompanying drawing, Figure 1 is a side view of a tea pot equipped with my improved strainer; Fig. 2 is a top plan view of the strainer detached from the teapot; Fig. 3 is a central longitudinal section through the strainer as shown in Fig. 2.

Referring to the drawing, 1 indicates a tea pot of ordinary construction and 2 the casing of my improved strainer applied thereto. Said strainer casing is preferably of approximately spherical form and comprises two substantially hemi-spherical halves 2ª and 2ᵇ spun out of metal and rib swaged together as shown at 2ᶜ. One of said halves is provided with an opening the lips of which are struck out from the body of the half 2ª to form an outlet as hereinafter described, whereas the other of said halves 2ᵇ is provided with an inlet opening 12 as also hereinafter described. Within the half 2ª is spun the hollow metal zone 2ᵈ the one edge of which is spun into the groove formed by the swaging of the halves 2ª and 2ᵇ and thus insuring a tight joint whereas the other edge lies adjacent the opening 13 and assists to support the strainer element 14. To the half 2ᵇ is secured, as shown at 3, one end of a bent arm 4, to the other end of which is pivoted, as shown at 5, a movable arm 6. From the arm 4 extends a rounded projection 7, and from the arm 6 extends a thin flat projection 8, these projections being adapted to be pressed together with the thumb and finger to separate the arms from each other to enable them to encircle the spout 9 of the tea or coffee pot. A spring 10, coiled around the pivot pin 5, and whose ends press against the two projections 7, 8 respectively, normally presses said arms together to form a clamp. Each arm is formed at its edges with inwardly extending flanges 11 and the edge of each flange is formed in a small circle at the bend of the arm and a larger circle in the outer portion of the arm, so that said arms may grasp a spout either of small or large diameter. Consequently the device is of such construction that it may be applied to a spout of substantially any size or shape.

Above its juncture with the arm 4 the strainer casing is cut away to form a circular inlet opening 12 which is so related to the clamp formed by said arms that the pouring end of the spout is opposite to, and may slightly enter, said opening. Opposite to said opening, but also in its upper portion, the casing is cut away to form a spout-shaped outlet opening 13. Between the two openings 12 and 13, but very much nearer the latter, is secured within the casing a strainer proper or screen 14 having therein perforations sufficiently small to prevent the passage of the tea or coffee grounds while permitting the flow of water. This screen extends downwardly and outwardly when the tea or coffee pot is at rest, the consequence of which is that grounds which are arrested thereon in pouring the liquid immediately fall off therefrom into the bottom of the strainer casing, when the tea or coffee pot is placed in its upright position.

It will be seen from the above construction that the strainer never drips, and that a free flow of the liquid is always permitted thereby. It does not drip because the bottom of the pouring opening is always higher than the residual amount of liquid when the tea or coffee pot is at rest. The flow is not obstructed because the grounds fall back from the perforated plate into the bottom of the strainer casing. These results are caused, in the first place, because the screen extends upwardly immediately in front of a part of the bottom of the strainer where it extends upwardly and forwardly, so that any grounds falling from the screen are received in the bottom of the strainer well below the bottom of the screen, and out of the way of the liquid subsequently flowing through the strainer, and, secondly, because the screen extends upwardly in a rearward direction, so that the upper portion of the screen makes an acute angle, and the lowermost portion thereof an obtuse angle, with the line of flow between the spout of the tea-pot and the outlet opening 13. By reason of this direction the force of the flow of the liquid itself has a tendency to wash down grounds from the screen, so that said grounds are removed automatically even when the liquid is being poured through the strainer, and, if this were not the case, the grounds would immediately fall off the screen, when the tea-pot is set at rest, since they would lie on the under side thereof.

I claim:—

1. As an article of manufacture, a tea strainer provided with tea-pot attaching means and including, in combination with a strainer element, a casing consisting of substantially hemi-spherical halves spun out of metal and rib swaged together, one of said halves having an outlet opening on one side of said strainer and the other half having an inlet opening on the opposite side of said strainer, and means within said halves and swaged thereto to support said strainer element in position.

2. As an article of manufacture, a tea strainer including, in combination with a strainer element, a casing consisting of substantially hemi-spherical halves spun out of metal and rib swaged together, one of said halves having an outlet opening on one side of said strainer and the other half having an inlet opening on the opposite side of said strainer, and a zone of metal within said halves and swaged thereto to support said strainer in a downwardly and outwardly extending position adjacent the said outlet opening of the one half.

In testimony whereof I have hereunto set my hand in the presence of two subscribing witnesses.

CHARLES STIRN.

Witnesses:
F. M. WRIGHT,
D. B. RICHARDS.

Copies of this patent may be obtained for five cents each, by addressing the "Commissioner of Patents, Washington, D. C."